United States Patent
Liu

(10) Patent No.: US 6,813,993 B1
(45) Date of Patent: Nov. 9, 2004

(54) HANDLE OF A ROTISSERIE USED IN BBQ

(76) Inventor: George Liu, No. 1-10, Shingjung Rd., Dounan Jen, Yunlin (TW), 630

( * ) Notice: Subject to any disclaimer, the term of this patent is extended or adjusted under 35 U.S.C. 154(b) by 0 days.

(21) Appl. No.: 10/623,698

(22) Filed: Jul. 22, 2003

(51) Int. Cl.[7] .............................. A23L 1/00; A47J 37/00; A47J 37/04; A47J 37/08; A47J 43/18
(52) U.S. Cl. ...................... 99/421 A; 99/419; 99/421 H; 16/110.1; 16/422
(58) Field of Search ............... 99/339, 340, 419–421 V, 99/394, 444–450; 30/321–323, 34.05, 123.5, 123.6, 123.7, 342; 294/61, 1.1, 5; 16/426, 422, 110.1, DIG. 24, 427; 84/94.2; 426/523

(56) References Cited

U.S. PATENT DOCUMENTS

| | | | | | |
|---|---|---|---|---|---|
| 3,742,840 | A | * | 7/1973 | Cogswell | 99/421 A |
| 4,126,086 | A | * | 11/1978 | Valade | 99/419 |
| 4,176,592 | A | * | 12/1979 | Doyle, Jr. | 99/419 |
| 4,258,617 | A | * | 3/1981 | Akwei | 99/419 |
| 4,539,751 | A | * | 9/1985 | Chan | 30/322 |
| 4,982,657 | A | * | 1/1991 | Ghenic | 99/421 A |
| 5,715,744 | A | * | 2/1998 | Coutant | 99/421 H |
| 5,775,207 | A | * | 7/1998 | Warren | 99/394 |
| 5,918,534 | A | * | 7/1999 | Medina | 99/342 |
| 6,196,121 | B1 | * | 3/2001 | Crowl | 99/421 A |
| 6,286,418 | B1 | * | 9/2001 | Berke et al. | 99/421 A |
| 6,349,451 | B1 | * | 2/2002 | Newman et al. | 16/427 |
| 6,508,167 | B1 | * | 1/2003 | Lu | 99/421 H |

* cited by examiner

Primary Examiner—Timothy F. Simone
(74) Attorney, Agent, or Firm—Rosenberg, Klein & Lee

(57) ABSTRACT

A rotisserie for use in barbecue has a rotary support, and a handle; the support has an annular trench at a tail end while the handle has a middle hole at a first section, and through holes, which communicate with the middle hole; beads are movably fitted in the through holes, and a spring-biased tube is passed around the handle to force the beads to project into the middle hole; the support is closely inserted into the middle hole with the beads engaging the annular trench to prevent the handle from separating from the rotary support; the tube has an annular slope on an inner side; when the tube is slid so that the annular slope thereof faces the beads, the beads are allowed to disengage the annular trench, and in turns, the handle can be separated from the support.

1 Claim, 5 Drawing Sheets

HANDLE OF A ROTISSERIE USED IN BBQ

BACKGROUND OF THE INVENTION

1. Field of the Invention

The present invention relates to a handle of a rotisserie, more particularly one that can be easily removed from, and connected to, a rotary element of the rotisserie.

2. Brief Description of the Prior Art

Referring to FIG. 5, a conventional barbecue oven has a support frame 10, a platform 11 disposed on top of the support frame 10, and a rotisserie positioned on the platform 11. The platform 11 includes a left smooth area 12 for the users to process and cut foods thereon, a middle roasting area 13 for roasting foods with, and a right cooking area 14 next to the roasting area 13 for heating foods with. The rotisserie consists of a frame 15 securely disposed next to a rear edge of the roasting area 13, a rotary support 16, and a handle 18; the rotary support 16 has forks 17 at two ends thereof for fixing foods to be roasted to the support 16; the frame 15 is formed with two opposing gaps 151; two ends of the rotary support 16 can be passed into the gaps 151 so that the rotary support 16 can be turned on the frame 15. The handle 18 is detachably joined to a right tail end of the rotary support 16 for operating the support 16 with.

The handle 18 is removed from the support 16 so that it will not become an obstacle when the users are cooking foods on the cooking area 14.

Referring to FIG. 6, the handle 18 has a metallic tube 181 fitted therein, which is formed with screw threads on an inner side, while the tail end of the support 16 is formed with screw threads 161 on an outer side; thus, the handle 18 can be joined to the support 16 by means of screwing the metallic tube 181 around the threaded tail end of the support 16, and can be removed from the support 16 when it is turned relative to the support 16 in the loosening direction.

However, the above rotisserie is found to have disadvantages as followings:

1. The users have to turn the rotary support frequently on the course of using the barbecue oven therefore they have to make the handle connected to, and then separate from, the rotary support 16 frequently. Consequently, the installation and removal of the handle 18 causes the user relatively much labor and time because the user have to hold the rotary support 16, and the handle 18 with her left and right hands respectively while she is screwing the handle 18 off the support 16.
2. The user might get burned when she is trying to make the rotary support 16 stay still to screw the handle 18 off the support 16 because she has to hold the rotary support with one hand, and because the rotary support is very hot on the course of roasting meat with the rotisserie.

SUMMARY OF THE INVENTION

It is a main object of the present invention to provide a handle to a rotisserie, which can be easily removed from, and connected to, a rotary support of the rotisserie.

The rotary support has an annular trench at a tail end while the handle has a middle hole at a first section, and several through holes extending from the outer side to communicate with the middle hole. Beads are each movably fitted in one of the through holes of the handle, and a spring-biased tube is passed around the handle so as to force the beads to project into the middle hole with an inner side of a first section of the tube. The tube has an annular slope on an inner side of an end portion, which is next to the first section thereof. The rotary support is closely inserted into the middle hole with the beads engaging the annular trench to prevent the handle from separating from the rotary support. When the tube is slid so that the annular slope thereof faces the beads, the beads are allowed to move out of the annular trench, and in turns, the handle can be separated from the support.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
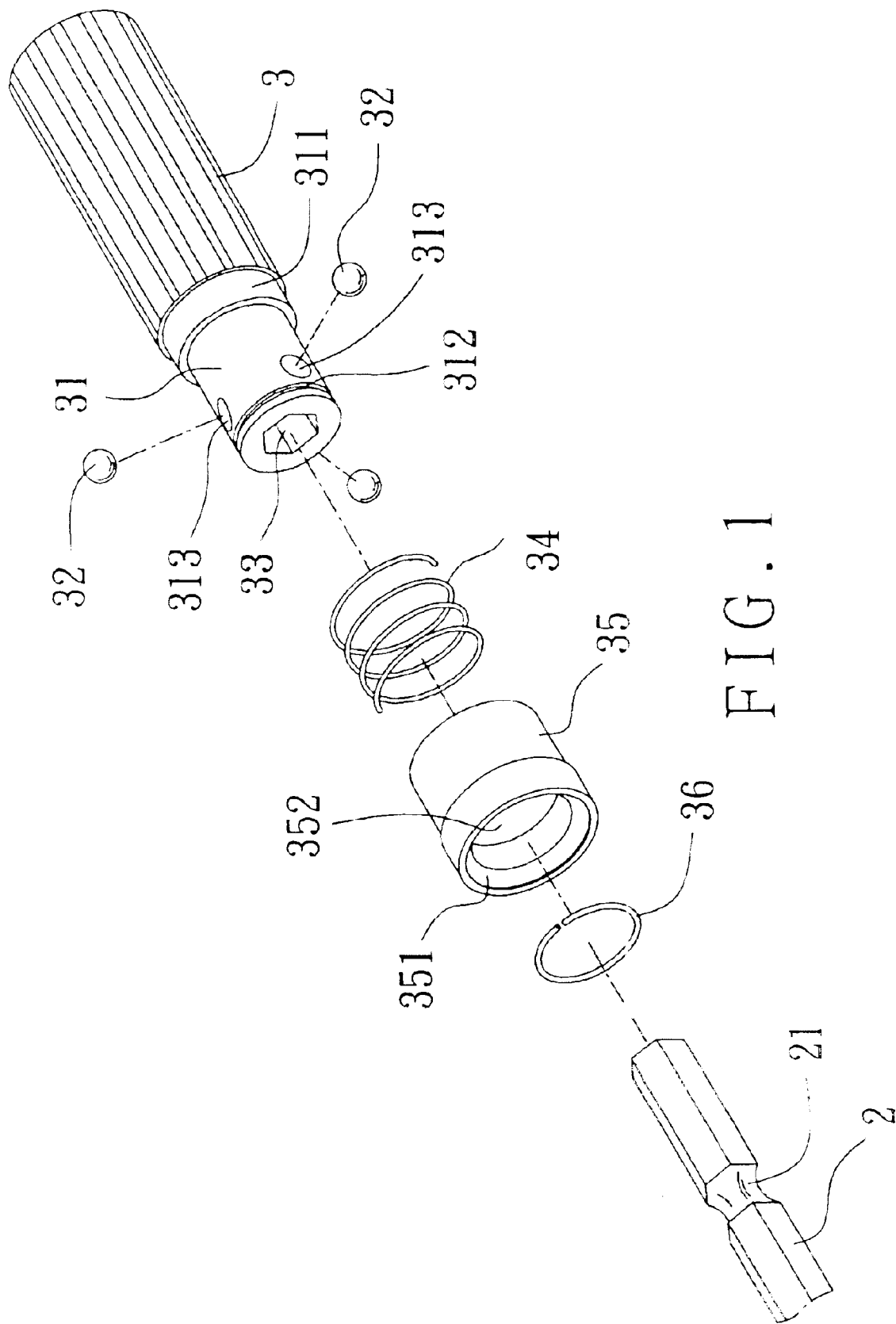
FIG. 1 is a partial exploded perspective view of the rotisserie according to the present invention.

Referring to FIG. 1, a preferred embodiment of a rotisserie in the present invention includes a rotary support 2 used for supporting foods to be roasted in position, and a handle 3.

Figure 2:
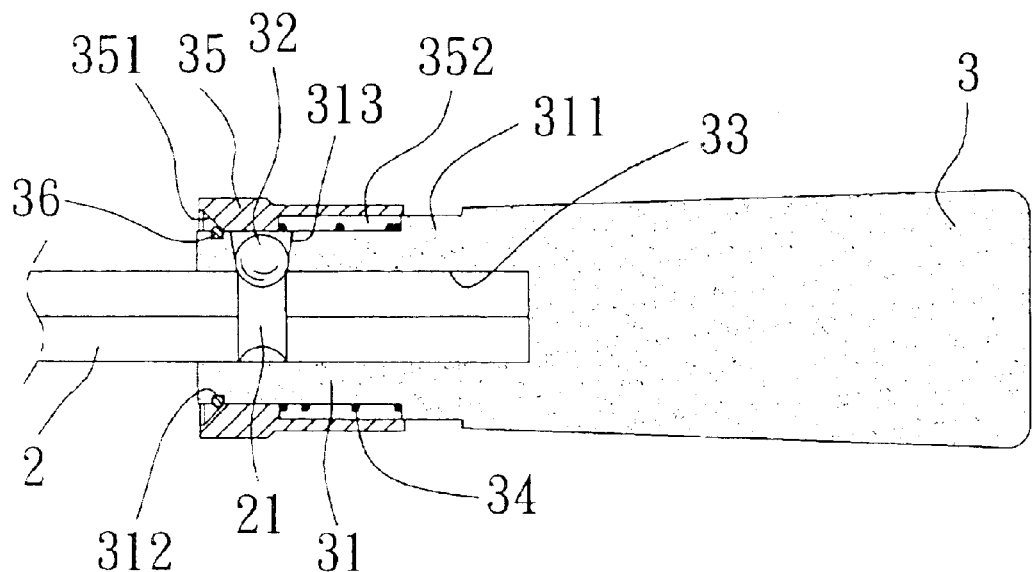
FIG. 2 is a partial cross-sectional view of the rotisserie of the present invention with the handle being joined to the rotary element.

The rotary support 2 is formed with a polygonal section, and has an annular trench 21 at a tail end thereof. The handle 3 has a connecting end portion 31, a middle hole 33 formed with a polygonal section, and several equidistantly spaced through holes 313 extending from an outer side to the middle hole 33 to communicate with the middle hole 33; each of the through hole 313 of the handle 3 has an engaging bead 32 positioned therein; the engaging beads 32 are movable in the through holes 313 to partially project from inner ends of the through holes 313, as shown in FIG. 2. The connecting end portion 31 is formed with an annular bump 311 at a tail end, and an annular groove 312 at a front end thereof.

An elastic element 34 is passed around the connecting end portion 31 of the handle 3. And, a tube 35 is passed around the connecting end portion 31 of the handle 3 and the elastic element 34; the tube 35 is formed with an annular slope 351 on an inner side of a front end thereof, an annular holding recess 352 on an inner side of a tail end portion thereof, and an annular bump (not numbered) between the annular holding recess 352 and the annular slope 351; two ends of the elastic element 34 are respectively stopped by means of the annular bump 311 of the handle 3, and the middle annular bump in the tube 35; a C-shaped ring 36 is fitted around the annular groove 312 of the handle 3 to prevent the tube 35 from separating from the connecting end portion 31 of the handle 3, as shown in FIG. 2. Thus, the tube 35 is biased away from the other end of the handle 3 to an active position by means of the elastic element 34 where the middle annular bump thereof forces the engaging beads 32 to stay partially in the middle hole 33 of the handle 3.

To connect the handle 3 to the rotary support 2, firstly, the tube 35 is slid towards the other end of the handle 3 against the elastic element 34 until the annular slope 351 faces the through holes 313; thus, the engaging beads 32 are movable away from the middle hole 33. Then, the polygonal middle hole 33 of the handle 3 is closely fitted around the tail end of the rotary support 2 until the inner ends of the through holes 313 face the annular trench 21. Finally, the tube 35 is released so that it is biased back to the active position to make the engaging beads 32 partially project into the annular trench 21, and in turns, the engaging beads 32 stay engaged with the rotary support 2 to prevent the handle 3 from separating from the support 2, as shown in FIG. 2.

Figure 3:
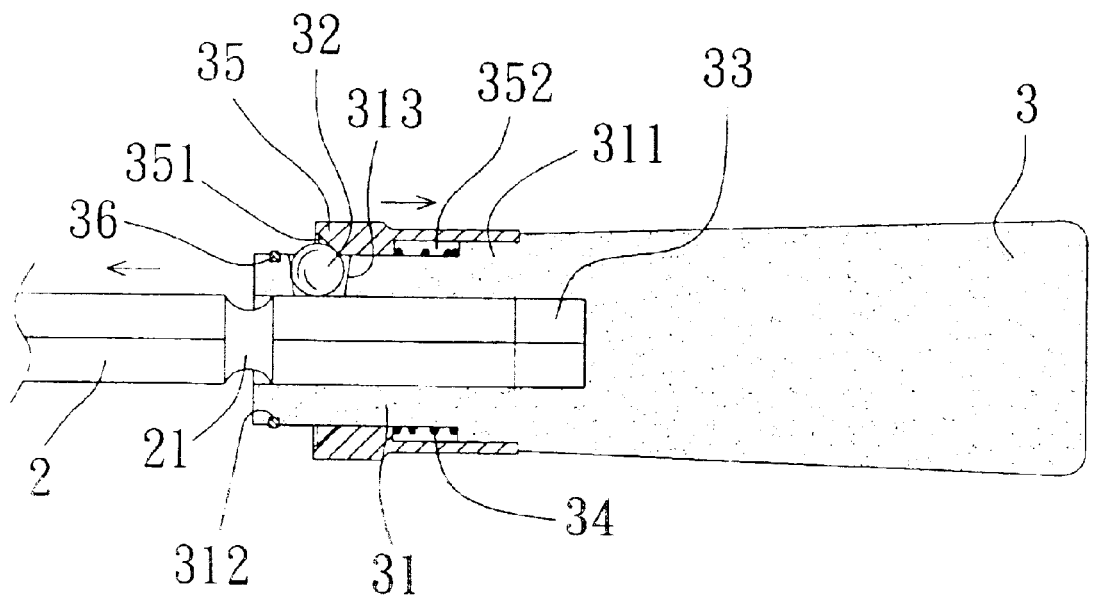
FIG. 3 is a partial cross-sectional view of the rotisserie of the present invention with the handle being removed from the rotary element.
Figure 4:
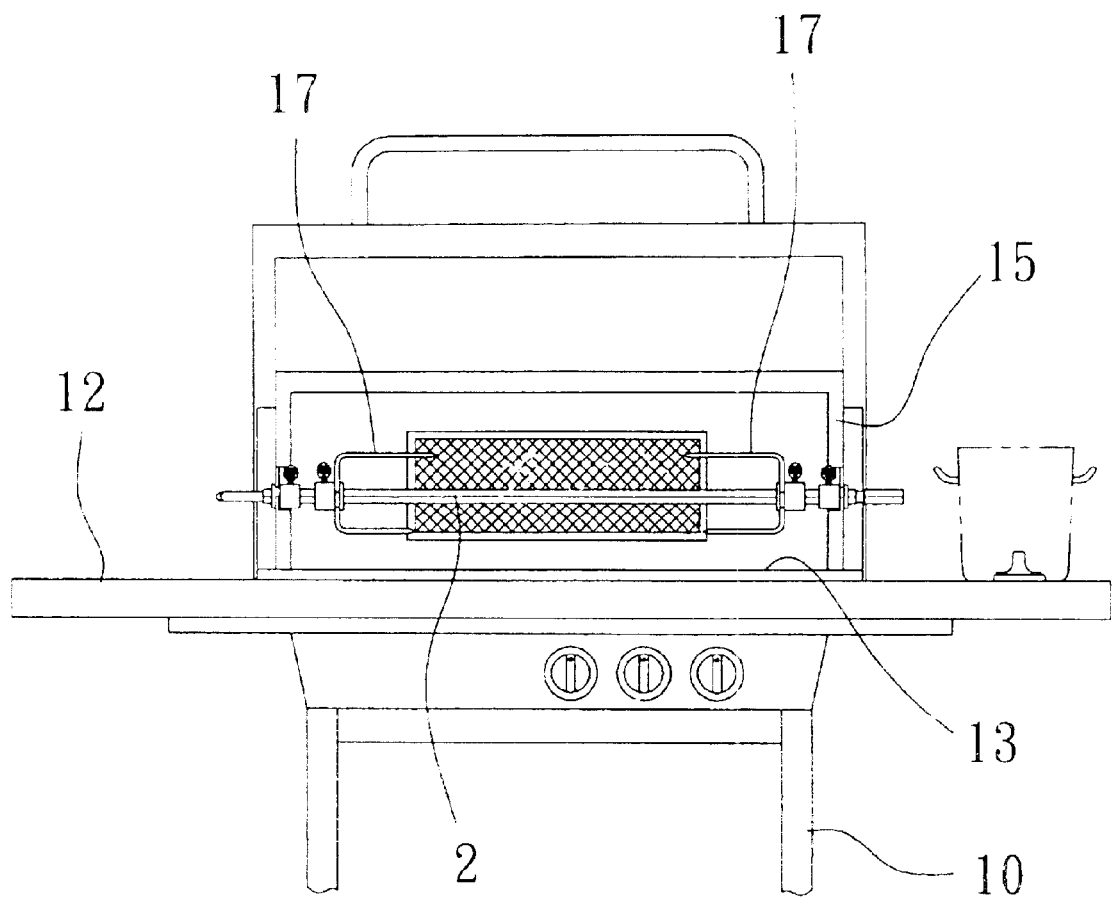
FIG. 4 is a front view of a barbecue oven with the rotisserie of the present invention.
Figure 5:
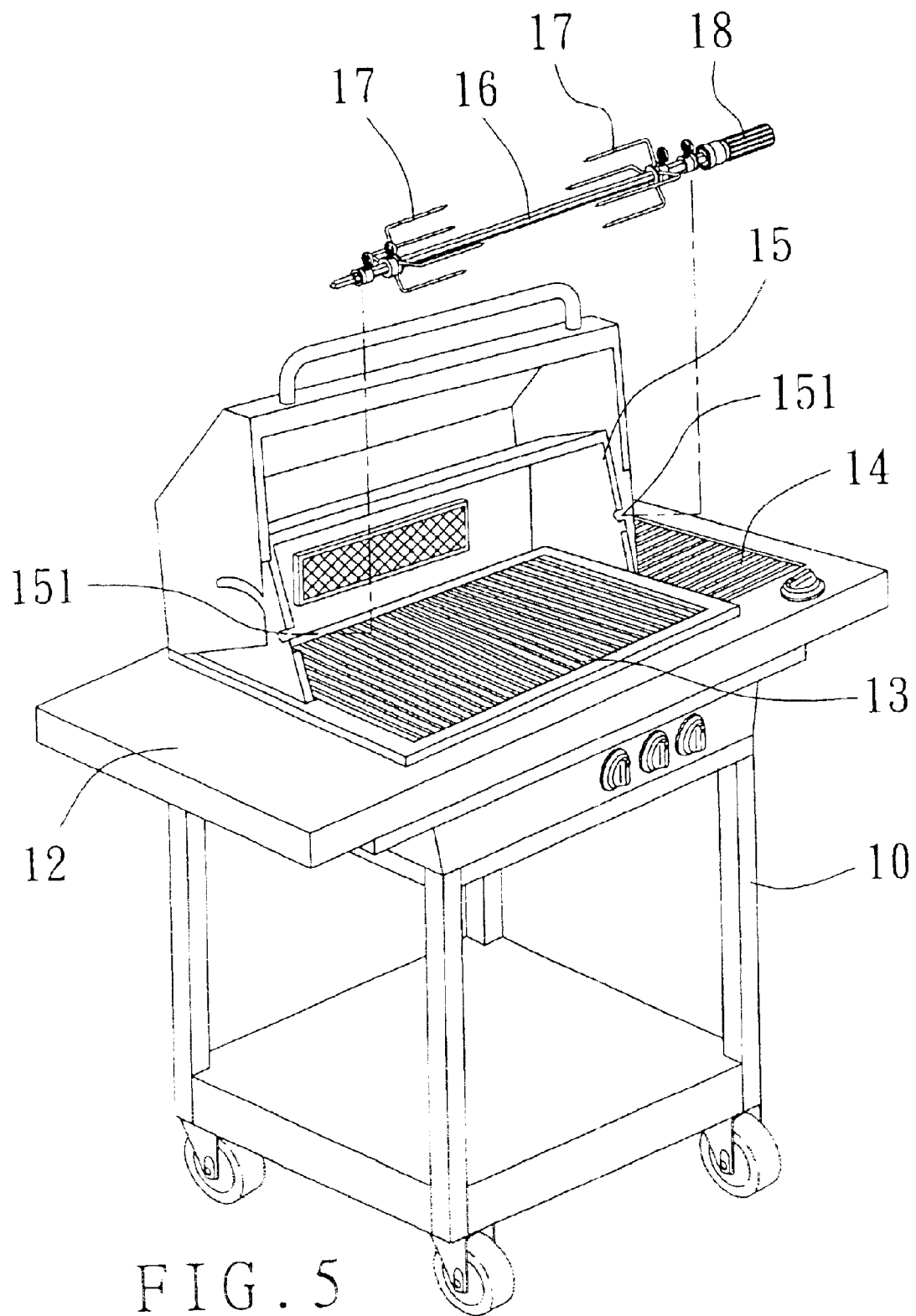
FIG. 5 is a perspective view of the conventional barbecue oven as described in the Background.
Figure 6:
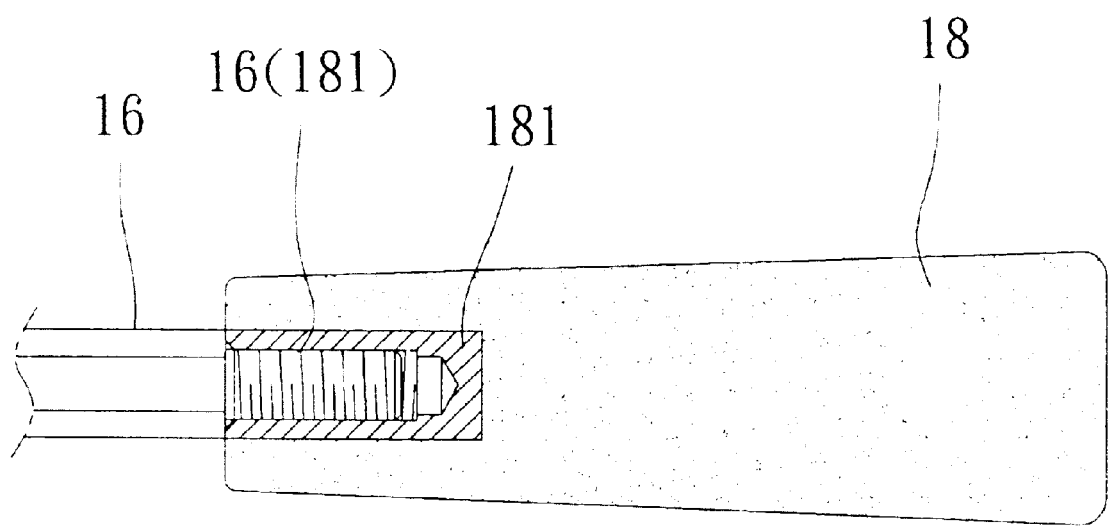
FIG. 6 is a partial cross-sectional view of the conventional rotisserie.

To separate the handle 3 from the rotary support 2, referring to FIG. 3, the tube 35 is first slid towards the other end of the handle 3 until the annular slope 351 faces the through holes 313; thus, the engaging beads 32 are movable away from the annular trench 21. Then, the handle 3 is slid along the tail end of the rotary support 2 to be removed from the support 2; the beads 32 will slide on the surface of the annular trench 21, and finally move out of the annular trench 21 when the handle 3 is being moved away from the tail end of the support 2.

From the above description, it can be easily understood that the rotisserie of the present invention has advantages as followings:

1. The user can easily separate the handle 3 from the rotary support 2 after she has slid the tube 35 away from the active position to allow the engaging beads 32 to move out of the annular trench 21. Similarly, the handle 3 can be easily connected to the rotary support 2 by means of passing the middle hole 33 around the support 2 and then releasing the tube 35 after the tube 35 has been moved so as to make the annular slope 351 faces the engaging beads 32. Therefore, the handle 3 is relatively easy and convenient to use.
2. For the same reason, the handle is very safe to use; there is no risk of the user getting burned by high temperature of the rotary support in removing or installing the handle because the user the user only has to touch the handle, not having to touch the rotary support, which can be very hot when being used.

What is claimed is:

1. A handle of a rotisserie used in barbecue, comprising
   a handle part having a middle hole at a first end portion, and a plurality of through holes extending from an outer side to an inner side to communicate with the middle hole;
   engaging beads each movably held in one of the through hole of the handle part; the beads being capable of partially projecting into the middle hole of the handle part; and
   a tube passed around the first end portion of the handle part; the tube having an annular slope on an inner side of an outward end thereof; the tube being biased to an active position by means of an elastic element where an inner side thereof next to the annular slope is around outer ends of the through holes of the handle part to force the beads to partially project into the middle hole; the beads being allowed to move away from the middle hole when the tube is slid on the handle part against elasticity of the elastic element until the annular slope faces the outer ends of the through holes;
   whereby the handle can be joined to a rotary support of the rotisserie by means of closely fitting a first end of the rotary element into the middle hole; the tube forcing the engaging beads to project into the middle hole to stay on an annular trench of the first end of the rotary support, thus preventing the handle from separating from the rotary support; the beads being movable away from the annular trench to make the handle separable from the rotary support after the tube has been moved so that the annular slope faces the outer ends of the through holes.

* * * * *